(12) United States Patent
Gassner et al.

(10) Patent No.: US 11,092,085 B2
(45) Date of Patent: Aug. 17, 2021

(54) METHOD AND SYSTEM FOR CONTROLLING A SEQUENTIAL GAS TURBINE ENGINE

(71) Applicant: General Electric Company, Schenectady, NY (US)

(72) Inventors: Martin Erwin Gassner, Bern (CH); Paula Beneyto Satorres, Rieden (CH); Vincent Georges Christian Daniel Lonneux, Lengnau (CH); Stefano Bernero, Oberrohrdorf (CH); Dirk Therkorn, Sr., Waldshut-Tiengen (DE)

(73) Assignee: General Electric Company, Schenectady, NY (US)

(*) Notice: Subject to any disclaimer, the term of this patent is extended or adjusted under 35 U.S.C. 154(b) by 516 days.

(21) Appl. No.: 15/458,912

(22) Filed: Mar. 14, 2017

(65) Prior Publication Data
US 2018/0266333 A1    Sep. 20, 2018

(51) Int. Cl.
*F02C 9/28* (2006.01)
*F02C 9/20* (2006.01)
*F02C 9/34* (2006.01)
*F02C 3/14* (2006.01)

(52) U.S. Cl.
CPC ............... *F02C 9/28* (2013.01); *F02C 3/14* (2013.01); *F02C 9/20* (2013.01); *F02C 9/34* (2013.01); *F05D 2270/08* (2013.01)

(58) Field of Classification Search
CPC ..................................... F02C 9/28; F02C 9/20
See application file for complete search history.

(56) References Cited

U.S. PATENT DOCUMENTS 8,794,008 B2    8/2014  Eroglu et al.
2003/0074171 A1*  4/2003  Desai ............... G05B 17/02
                                                    703/8

(Continued)

FOREIGN PATENT DOCUMENTS

EP    2600063 A2    6/2013
EP    2700879 A2    2/2014
EP    3037726 A1    6/2016

OTHER PUBLICATIONS

Extended European Search Report for EP Application No. 18160629.4 dated Jul. 13, 2018; 8 pgs.

(Continued)

*Primary Examiner* — Katheryn A Malatek
(74) *Attorney, Agent, or Firm* — Fletcher Yoder, P.C.

(57) ABSTRACT

A method for operating a gas turbine system includes utilizing a gas turbine controller to determine a schedule for a firing temperature for operative burners of a second combustor located downstream of a first combustor when the gas turbine system is operating in a low part load mode. During the low part load mode, multiple burners for the second combustor are switched-off. Further, the schedule is determined based on a position of inlet guide vanes of a compressor of the gas turbine system located upstream of both the first and second combustors. The method also includes controlling the firing temperature of the operative burners utilizing the schedule during the low part load mode to keep the gas turbine system within relevant operational limits of the gas turbine system.

19 Claims, 4 Drawing Sheets

(56) References Cited

U.S. PATENT DOCUMENTS

| | | | |
|---|---|---|---|
| 2009/0229238 A1* | 9/2009 | Zhang | F23N 5/003 60/39.24 |
| 2011/0056211 A1* | 3/2011 | Schell | F02C 3/305 60/775 |
| 2012/0017601 A1* | 1/2012 | Eroglu | F02C 6/003 60/776 |
| 2012/0156005 A1 | 6/2012 | Nielsen et al. | |
| 2013/0219904 A1 | 8/2013 | Eroglu et al. | |
| 2015/0040573 A1* | 2/2015 | Ferreira-Providakis | F01N 3/18 60/772 |
| 2016/0018111 A1 | 1/2016 | Therkorn et al. | |
| 2016/0084111 A1 | 3/2016 | Bei et al. | |
| 2016/0333731 A1 | 11/2016 | Zhang et al. | |

OTHER PUBLICATIONS

Guthe, Felix, et al.; "The Reheat Concept: The Proven Pathway to Ultralow Emissions and High Efficiency and Flexibility", Journal of Engineering for Gas Turbines and Power, Mar. 2009, vol. 131, pp. 1-7.

* cited by examiner

METHOD AND SYSTEM FOR CONTROLLING A SEQUENTIAL GAS TURBINE ENGINE

BACKGROUND OF THE INVENTION

The subject matter disclosed herein relates to gas turbine systems, and more particularly, to sequential combustion gas turbines.

Gas turbine systems generally include a compressor, a combustor, and a turbine. In the case of sequential combustion gas turbine systems, there may be a second combustor section and a second turbine. Towards the lower limit of these turbine system's load range, the operation may be limited by carbon monoxide (CO) emissions that increase as the load decreases. To decrease the lower limit of the turbine system's load range, a low part load (LPL) operation mode may be utilized. LPL mode may further lower the limit by switching off individual burners of the second combustor (sequential environment (SEV) combustor) to keep the remaining burners within their allowable operation range. Reducing air flow through a hot gas path of the gas turbine system via a closing of compressor inlet guide vanes (IGV) may also help to keep SEV burners within their allowable operation range.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a method for operating a gas turbine system. The method includes utilizing a gas turbine controller to determine, based on a first operational parameter of the gas turbine system, a limiting firing temperature for operative burners of a second combustor located downstream of a first combustor while the gas turbine system is operating in a low part load mode. During the low part load mode, multiple burners for the second combustor are switched-off. Further, the limiting firing temperature keeps a firing temperature of the operative burners at or below a specific value or within a specific range. This keeps the gas turbine system within relevant operational limits of the gas turbine system. The method also includes controlling the firing temperature of the operative burners utilizing the limiting firing temperature during the low part load mode to keep the gas turbine system within the relevant operational limits.

In a second embodiment, a method for operating a gas turbine system includes utilizing a gas turbine controller to determine a schedule for a firing temperature for operative burners of a second combustor located downstream of a first combustor when the gas turbine system is operating in a low part load mode. During the low part load mode, multiple burners for the second combustor are switched-off. Further, the schedule is determined based on a position of inlet guide vanes of a compressor of the gas turbine system located upstream of both the first and second combustors. The method also includes controlling the firing temperature of the operative burners utilizing the schedule during the low part load mode to keep the gas turbine system within relevant operational limits of the gas turbine system.

In a third embodiment, a gas turbine system includes a gas turbine controller including a processor and a non-transitory memory encoding processor-executable instructions. The instructions include determining a schedule for a firing temperature for operative burners of a second combustor located downstream of a first combustor when the gas turbine system is operating in a low part load mode, where multiple burners for the second combustor are switched-off. The schedule is determined based on a position of inlet guide vanes of a compressor of the gas turbine system located upstream of both the first and second combustors. The instructions also include controlling the firing temperature of the operative burners utilizing the schedule during the low part load mode to keep the gas turbine system within relevant operational limits of the gas turbine system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to systems and methods for controlling a gas turbine system (e.g., a sequential combustion gas turbine system) while in a low part load (LPL) mode. The gas turbine system may be limited by a particular load range. In some embodiments, the load range may depend the firing temperature of the sequential environmental (SEV) combustor burners. For example, the load range may be limited by one or more factors such as maximum acceptable firing temperature with respect to thermal limits of turbine parts, turbine part lifetime, maximum allowable firing temperature for nitrous oxide ($NO_x$) emissions, minimum firing temperature for low carbon monoxide (CO) emissions, and minimum firing temperature for steam cycle operability. Therefore, a method for fine control of the SEV combustor burners' firing temperature may be beneficial. To control the burners' firing temperature, a limiter may be utilized. As will be discussed in further detail below, the limiter may be based on one or more parameters that represent the firing temperature with respect to the above mentioned limiting factors. The one or more parameters may be, for example, a position of inlet guide vanes (IGV) of the compressor, an absolute or relative gas turbine load, an absolute or relative power plant load, compressor air mass flow, compressor discharge pressure, combustor inlet and outlet pressures, turbine inlet and outlet pressures, combustion pulsation (e.g., flame pulsation that may be caused by a lean fuel-to-air ratio), cooling air mass flow, cooling air pressure, cooling air temperature, hot gas path temperature, total or partial fuel flow, number of burners of the SEV combustor in operation or switched-off, ambient temperature, ambient pressure, or ambient humidity. Furthermore, in some embodiments, an air flow provided from a source (e.g., internal or external source) may enhance the cooling of turbine parts in order to enable operation of the gas turbine system when the system has reduced air mass flows (e.g., when the IGV of the compressor are further closed).

Figure 1:
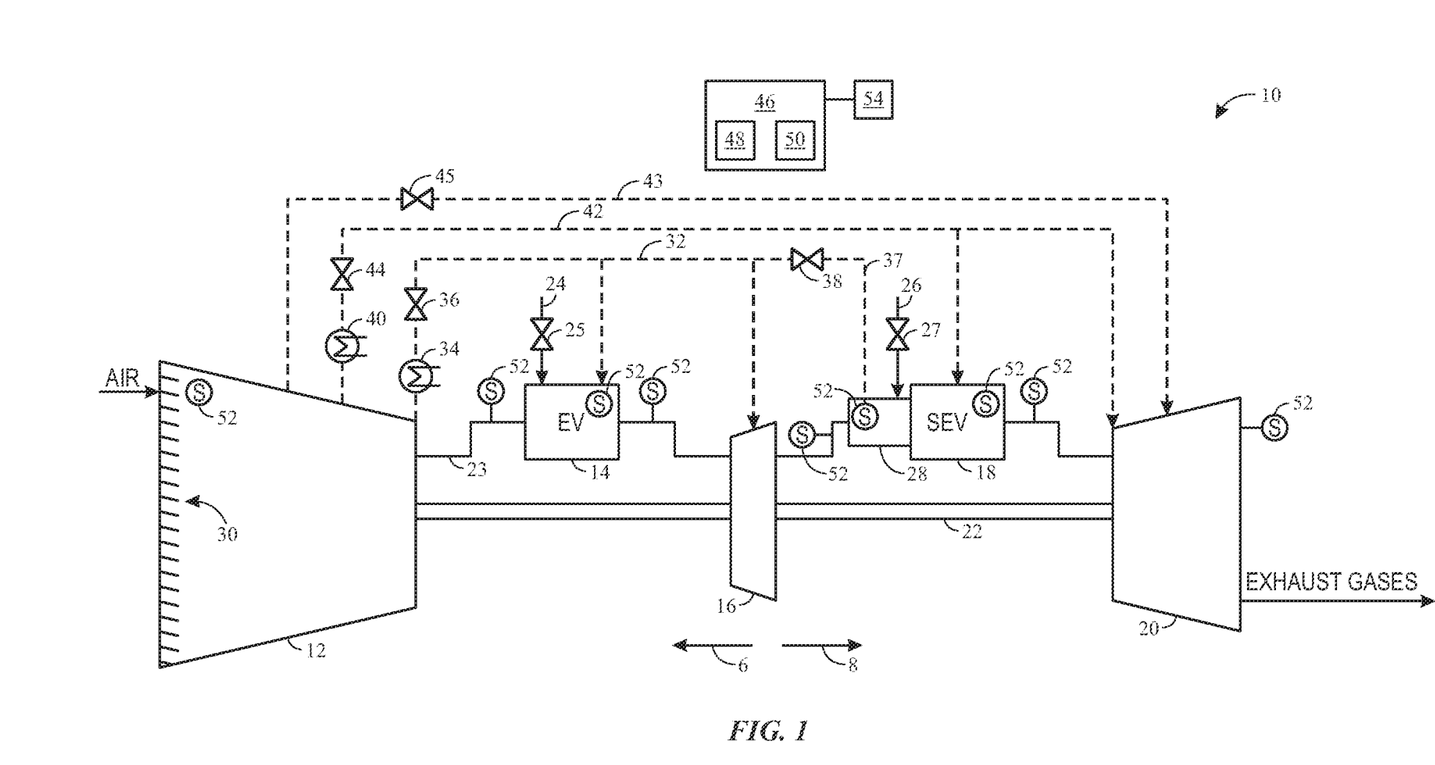
FIG. 1 illustrates an embodiment of a gas turbine with sequential combustion that may utilize the disclosed methods of controlling firing temperatures.

In the discussed embodiments a set of directions may be used. For example, an upstream direction 6 and a downstream direction 8. Turning now to the figures, FIG. 1 illustrates an embodiment of a gas turbine system 10 with sequential combustion that may utilize the disclosed methods of controlling firing temperatures. It should be noted that the firing temperatures mentioned above may be determined directly via measuring, determined via a model, and/or determined via a relationship with respect to metal temperature of the gas turbine system 10 parts and/or part lifetime. Listed in order towards the downstream direction 8, the gas turbine system 10 includes a compressor 12, a first combustor 14 (e.g., environmental (EV) combustor), a first turbine 16, a second combustor 18 (e.g., sequential environmental (SEV) combustor), and a second turbine 20. In some embodiments, the gas turbine system 10 may include a generator coupled to a shaft 22. In some embodiments, the gas turbine system 10 may be coupled to a different load via the shaft 22. A fuel, gas, or oil (e.g., natural gas) may be introduced via a fuel line 24, and mixed with compressed air 23, which is then combusted in the first combustor 14. In some embodiments, fuel flow in fuel line 24 may be controlled via a first fuel valve 25. Hot gases from combustion of the air fuel mixture in the first combustor 14 are partially expanded in the first turbine 16 and force turbine blades of the first turbine 16 to rotate the shaft 22. As the shaft 22 rotates, blades within the compressor 12 also rotate, thereby compressing oxidant (e.g., compressed air 23) through the compressor 12. As a load of the turbine system 10 increases, the second combustor 18 may begin operation. When the second combustor 18 is in operation, additional fuel, via a fuel line 26, may be added to gases in burners 28 of the second combustor 18, and combusted in the second combustor 18. In some embodiments, fuel flow in the fuel line 26 may be controlled via a second fuel valve 27. There may be additional valves configured to control fuel flow (e.g., switch on and off) to individual burners of the burners 28. Similar to operation of the first turbine 16, combusted gases exiting the second combustor 18 expand in the second turbine 20, and force turbine blades of the second turbine 20 to rotate, thereby exerting torque on the shaft 22. In some embodiments, exhaust gases of the gas turbine system 10 may be fed to a heat recovery steam generator and/or a waste heat boiler of a combined cycle power plant and/or another waste heat application.

For controlling intake air mass flow, the compressor 12 may have at least one row of variable inlet guide vanes (IGV) 30. The IGV 30 may be upstream 6 of both the first combustor 14 and the second combustor 18. When the IGV 30 is closed, air mass flows and operation pressures throughout the gas turbine system 10 may decrease. Further, it should be noted that when the IGV 30 is described as closed herein, closed may also refer to the IGV 30 moving close to a closed position. In some embodiments, the minimum position of the IGV 30 (e.g., the most closed position) may depend on compressor characteristics, cooling operations, and minimum number of burners 28 for stable combustion in the second combustor 18. Further, some of the compressed air 23 may be tapped off and used as high pressure cooling air 32, recooled via a high pressure cooling air cooler 34 and fed as high pressure cooling air 32 to the first combustor 14 and to the first turbine 16. The mass flow of the high pressure cooling air 32 may be controlled by a high pressure cooling air control valve 36. Additionally, or in the alternative, there may be one or more valves to control individual feeds of high pressure cooling air 32 to the first combustor 14 and to the first turbine 16. Some of the high-pressure cooling air 32 may be fed as carrier air 37 to burners 28 of the second combustor 18. The mass flow of the carrier air 37 may be controlled by a carrier air control valve 38.

Some partially compressed air from the compressor 12 may be recooled via a low pressure cooling air cooler 40 and fed as low pressure cooling air 42 to the second combustor 18 and to the second turbine 20. The mass flow of low pressure cooling air 42 may be controlled via a low pressure cooling air control valve 44. Additionally, or in the alternative, there may be one or more valves to control individual feeds of low pressure cooling air 42 to the second combustor 18 and to the second turbine 20.

Partially compressed cooling air 43 may also be tapped off from the compressor 12 and routed to the second turbine 20 to cool components of the second turbine 20. Cooling air 43 may be controlled via a cooling air control valve 45.

Furthermore, some or all of the operations of the system 10 may be controlled by instrumentation such as a controller 46 (e.g., a computer-based controller) that has a micro-processor 48, a memory 50, and executable code. The micro-processor 48 may be any general purpose or application-specific processor. The memory 50 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by a processor (e.g., the micro-processor 48) or by any general purpose or special purpose computer or other machine with a processor (e.g., the micro-processor 48).

The controller 46 may also be configured to receive signals (e.g., inputs) from one or more sensors 52 indicating various parameters of the system 10. For example, the one or more sensors 52 may measure and send as a signal to the controller absolute or relative gas turbine 10 load, absolute or relative power plant load, compressor 12 air mass flow, position of the IGV 30, compressor 12 discharge pressure, combustor 14, 18 inlet and outlet pressures, turbine 16, 20 inlet and outlet pressures, cooling air 32, 42, 43 mass flow, cooling air 32, 42, 43 pressure and/or temperature, hot gas path temperatures, total or partial fuel flow, number of burners 28 in operation (or switched-off), ambient conditions (e.g., temperature, pressure, and/or humidity), combustion pulsation, and other relevant parameters. The sensors 52 may also be configured to measure and send as a signal (e.g., input) to the controller 46 temperature and/or pressure within a steam cycle, hot gas path temperatures, inlet air flow within the gas turbine system 10, fuel flow to the second combustor 18, exhaust air flow within the gas turbine system 10, cooling air flow within the gas turbine system 10, combustion pulsation, carbon monoxide (CO) emissions, and/or nitrous oxide ($NO_x$) emissions. In some embodiments, the one or more sensors 52 may be acoustic sensors, automotive sensors, chemical sensors, electric/magnetic sensors, environmental sensors, optical sensors, mechanical sensors, thermal/temperature sensors, proximity sensors, and/or any other relevant form of measurement device for the above parameters.

Further, the controller 46 may be coupled to one or more input/output devices 54 (e.g., mouse, keyboard, monitor, touch screen, network communication circuitry, speaker, microphone, toggles, switches, dials). More specifically, input devices 54 may in the form of a mouse, microphone, switches, touch screen, or any combination thereof. In some embodiments, an operator may send a signal via the input device 54 to adjust firing temperatures of the burners 28. This may take the form of altering (e.g., limiting) fuel flow to the burners 28, switching on or off one or more burners 28, or adjusting any other relevant parameter that would alter the firing temperature of the burners 28. In some embodiments, the controller 46 may contain instructions to adjust the firing temperature of the burners 28 based on a limiting firing temperature or a firing temperature schedule without operator input. Further, it should be noted that, although not shown, the controller 46 may be coupled to all of the elements in FIGS. 1-2 (e.g., burners 28, IGV 30, valves, sensors 52, combustors 14, 18, fuel lines, air lines, etc.), and may be configured to control all of the elements of FIGS. 1-2.

Further the controller 46 may determine an operational point to begin operating the gas turbine system 10 in the low part load (LPL) mode based at least on an operational parameter. The operational parameter may include, for example, one or more of a position of the inlet guide vanes 30, a fuel flow to an SEV combustor (e.g., second combustor 18), a temperature within a steam cycle, a pressure within a steam cycle, an inlet air flow within the gas turbine system, an exhaust air flow within the gas turbine system 10, cooling air flow within the gas turbine 10, combustion pulsation, hot gas path temperatures, carbon monoxide emissions, or nitrous oxide emissions. As mentioned above, during LPL mode, individual burners 28 are switched on/off in order to keep relevant gas turbine and plant parameters within acceptable operational limits for efficient and robust operation. For example, individual burners of the burners 28 may be switched on/off according to operational limits that may include one or more of a temperature within the steam cycle, a fuel flow to an SEV combustor (e.g., second combustor 18), pressure within the steam cycle, inlet or exhaust air flow within the gas turbine system 10, cooling air flow within the gas turbine system 10, hot gas path temperatures, a position of the inlet guide vanes 30, combustion pulsation, and/or nitrous oxide emissions. More specifically, the operational limits and relevant gas turbine and plant parameters may include temperatures within a steam cycle, which may depend upon exhaust temperatures and pressures within the gas turbine system 10, which in turn may depend on firing temperatures and pressures within the gas turbine system 10. Accordingly, a limiting firing temperature for switched-on burners 28 may be utilized in controlling the gas turbine system 10 during LPL mode with respect to certain operational limits (e.g., a maximum acceptable firing temperature considering a metal temperature of turbine parts, a lifetime of turbine parts, a maximum allowable firing temperature for nitrous oxide emissions, a minimum firing temperature to limit carbon monoxide emissions, and a minimum temperature for steam cycle operability).

During LPL operation, the limiting firing temperature may be controlled (e.g., to keep the firing temperature of burners 28 at or below a specific value, or within a specific range) via controller 46 to keep the firing temperature of burners 28 within operational limitations such as maximum allowable firing temperature considering temperature of turbine parts, maximum allowable firing temperature for nitrous oxide emissions, minimum firing temperature allowable for low carbon monoxide emissions, and/or minimum firing temperature for steam cycle operability. The limiting firing temperature may be dependent on a parameter that represents the above operational limitations. The parameter may include, but is not limited to, absolute or relative gas turbine 10 load, absolute or relative plant load, compressor 12 air mass flow, position of the inlet guide vanes 30 (IGV), compressor 12 discharge, combustor 14, 18 inlet and outlet pressure, turbine 16, 20 inlet and outlet pressure, cooling air mass flow, cooling air pressure, cooling air temperature, combustion pulsation, hot gas path temperatures, total fuel flow, partial fuel flow, number of burners 28 in operation (e.g., switched-on), number of burners not in operation (e.g., switched-off), ambient temperature, ambient pressure, and/or ambient humidity.

Figure 2:
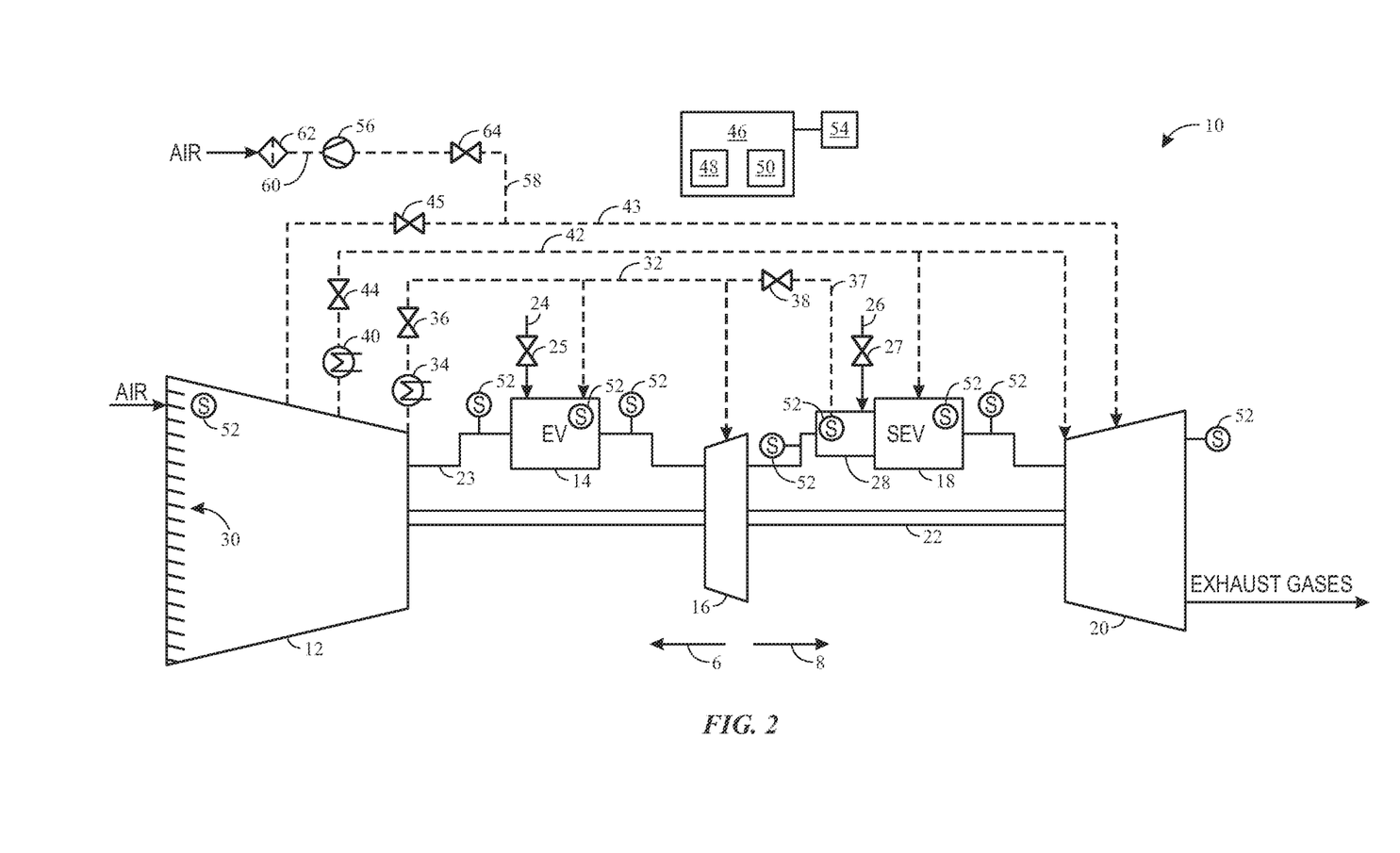
FIG. 2 illustrates an embodiment of the gas turbine of FIG. 1 with an external blower.

The embodiment depicted in FIG. 2 may be as described above in regard to FIG. 1 except that a blower 56 (e.g., external blower) may be coupled to the gas turbine system 10. As discussed above, hot gas parts (e.g., first combustor 14, first turbine 16, burners 28, second combustor 18, and second turbine 20) may be internally cooled by air that is diverted from main gas path (e.g., via high pressure cooling air 32 and low pressure cooling air 42). However, during low part load operation, when the IGV are closed, air mass flows and operation pressures throughout the gas turbine system 10 may decrease. Further, LPL mode switches off individual burners 28 when the gas turbine system 10 is deloading thereby keeping the firing temperature of switched-on burners 28 at a high level thereby limiting CO emissions (e.g., through sufficient burn out of fuel in the second combustor 18). To do this LPL mode effectively concentrates fuel to less burners 28 (e.g., by switching-off burners 28), thus keeping the flame temperature high. In some embodiments, the blower 56 may provide additional external cooling air 58 during low part load (LPL) mode when the inlet guide vanes 30 (IGV) are more closed relative to their regular operation position. In some embodiments, the blower 56 may provide external cooling air 58 when the IGV 30 are in a closed position.

The blower 56 may be coupled to cooling air 43 supply lines to provide additional external cooling air 58 to the gas turbine system 10 during low part load operation. In some embodiments, the blower 56 may first receive filtered air 60 from an air filter 62. External cooling air 58 flow may be controlled via external cooling air valve 64. During operation of the blower (e.g., during LPL operation), external cooling air valve 64 may be open while cooling air control valve 45 may be closed. Conversely, during standard operation, cooling air valve 45 may be open and the external cooling air valve 64 may be closed. Operation of the blower 56 may be triggered based on a pressure ratio between one or more of the cooling air systems (e.g., low pressure cooling air 42, high pressure cooling air 32, and/or cooling air 43) and system exhaust. In some embodiments, the pressure ratio may be based off associated parameters (e.g., IGV 30 position, temperature of elements, etc.). Utilizing the blower 56 during LPL mode may provide for a further decrease in minimum load by further closing the IGV 30 (e.g., further closed from a position of −50 degrees), switching off more burners (e.g. 18 to 22 burners out of 24 burners). It may be appreciated that the operation of the blower 56 and valves 45, 64 may be controlled via controller 46. In some embodiments, the controller may cause a cooling air flow to be provided from a steam injection system and/or an internal source of the gas turbine system 10.

Figure 3:
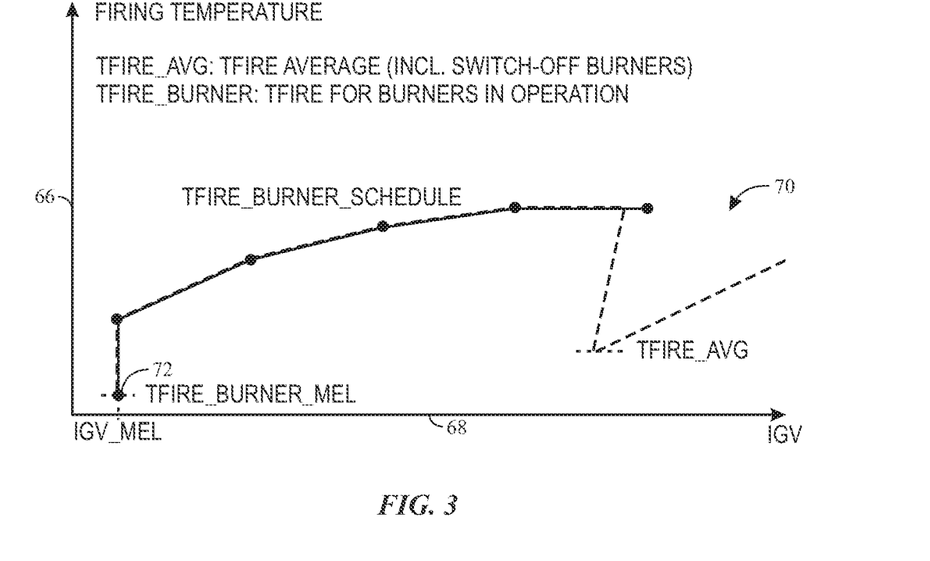
FIG. 3 illustrates an embodiment of a firing temperature schedule that may be utilized with the gas turbines of FIGS. 1 and 2.

An embodiment of controlling the limiting firing temperature described above may be seen in FIG. 3. FIG. 3 illustrates an embodiment of a firing temperature schedule 70 (e.g., determined via scheduling algorithms) that may be utilized with the gas turbine system 10 of FIGS. 1 and/or 2. The y axis 66 may be representative of a firing temperature of burners 28. The x axis 68 may be representative of a position of inlet guide vanes (IGV). For example, a position of the IGV may be more closed on the x axis 68 as it approaches the y axis 66. Further, as displayed in the current embodiment, Tfire_burner is defined as the limiting firing temperature for burners 28 in operation, and Tfire_avg is the average firing temperature for all burners 28 (e.g., switched-on and switched-off burners).

In the current embodiment (e.g., firing temperature schedule 70), the limiting firing temperature is interpolated as an oblique line with respect to a position of the IGV. In some embodiments, a limiting firing temperature schedule may be obtained via experimentation, interpolation of data points, a pressure ratio, and/or a calculated energy balance of the combustible and the oxidant within a burner. Further, in some embodiments, the firing temperature schedule 70 (e.g., limiting firing temperature) may be with respect to a parameter (e.g., operational parameter) other than the position of the IGV. For example, the firing temperature schedule 70 may be with respect to an absolute or relative gas turbine 10 load, an absolute or relative power plant load, compressor 12 air mass flow, compressor 12 discharge pressure, combustor 14, 18 inlet and outlet pressures, turbine 16, 20 inlet and outlet pressures, cooling air mass flow, cooling air pressure, cooling air temperature, hot gas path temperature, total or partial fuel flow, number of burners 28 in operation or switched-off, ambient temperature, combustion pulsation, emissions, ambient pressure, and/or ambient humidity.

In the current embodiment, the operation range is limited by a minimum acceptable position (e.g., a most closed position) of the IGV 30. The minimum acceptable position of the IGV 30 may depend on compressor characteristics, cooling requirements, and a minimum number of burners 28 to be operated (e.g., switched-on) in order to keep combustion stable. In the current embodiment, a minimum load 72 (e.g., minimum firing temperature relative to the minimum acceptable position of the IGV 30) may be termed minimum environmental load (MEL). Accordingly, the minimum load 72 is limited by the minimal acceptable position of the IGV 30, a minimum number of operative burners 28 that need to be operated to keep combustion stable, an operational range of the firing temperature of the operative burners 28 and/or controller stability. Controller stability is the ability of the controller to 46 to keep a limit (e.g., firing temperature) constant via a fuel flow control valve. For example, at low fuel flow rates, small movements of the fuel flow control valve may lead to large temperature changes.

Overall, the firing temperature schedule 70 may be utilized to determine an optimum control of the firing temperature (e.g., maximum firing temperature) for maximizing efficiency in the gas turbine system 10 with respect to one or more parameters (e.g., a temperature within a steam cycle, a fuel flow to an SEV combustor (e.g., second combustor 18), a pressure within a steam cycle, an inlet air flow within the gas turbine system, an exhaust air flow within the gas turbine system, hot gas path temperatures, a cooling air flow within the gas turbine, a position of the inlet guide vanes 30, carbon monoxide emissions, and/or nitrous oxide emissions) that may represent operational limits.

Figure 4:
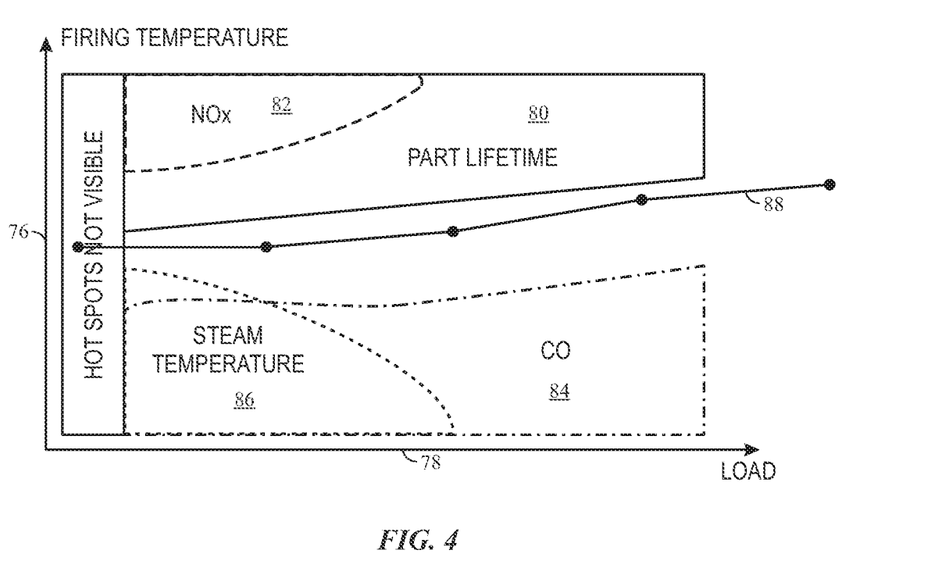
FIG. 4 illustrates an embodiment of the firing temperature of the gas turbines of FIGS. 1 and 2 relative to operational limits of the gas turbine.

FIG. 4 illustrates an embodiment of the firing temperature of the gas turbine engine 10 of FIGS. 1 and 2 with respect to engine load. For example, the y axis 76 represents a firing temperature of the burners 28 and the x axis 78 represents an engine load of the gas turbine system 10. Further, the firing temperature may depend on operational limits which may include maximum acceptable firing temperature for turbine parts 80 (e.g., part lifetime), maximum allowable firing temperature for nitrous oxide emissions 82 (e.g., NON), minimum firing temperature allowable for low carbon monoxide emissions 84 (e.g., CO), and minimum firing temperature for steam cycle operability 86 (e.g., steam temperature). The firing temperature may be controlled via the limiting firing temperature (e.g., limited by the operational limits) to maximize the firing temperature as allowed by the operational limits illustrated in the current embodiment. For example, in some embodiments the firing temperature may be controlled to lie on line 88 that may be representative of a limiting firing temperature.

Figure 5:
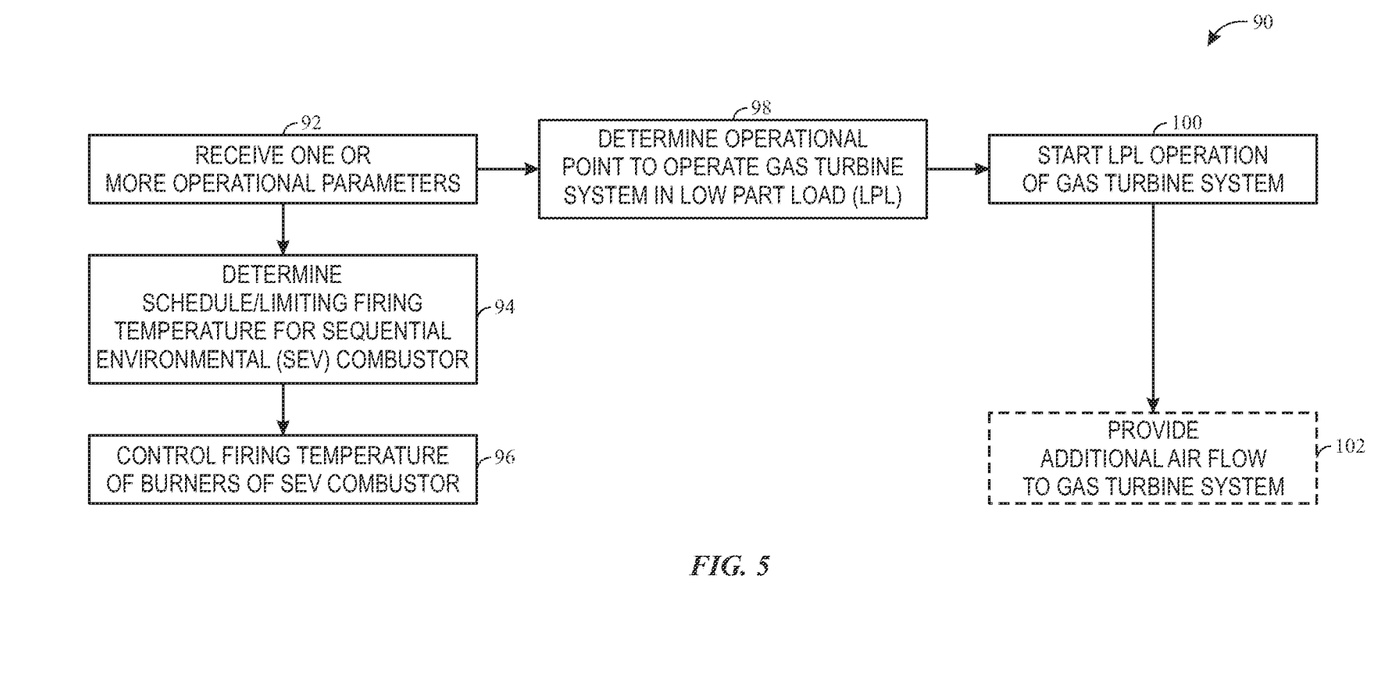
FIG. 5 illustrates a flow chart of an embodiment of a method for controlling a gas turbine system.

FIG. 5 illustrates a flow chart of an embodiment of a method 90 for controlling a gas turbine system. In block 92, a controller may receive one or more operational parameters from one or more sensors. The one or more parameters may include, but are not limited to a position of inlet guide vanes, an absolute or relative gas turbine load, an absolute or relative power plant load, compressor air mass flow, compressor discharge pressure, combustor inlet and outlet pressures, turbine inlet and outlet pressures, cooling air mass flow, cooling air pressure, cooling air temperature, hot gas path temperature, total or partial fuel flow, number of burners in operation of switched-off, ambient temperature, ambient pressure, ambient humidity, a fuel flow to an SEV combustor (e.g., second combustor 18), temperature within a steam cycle, pressure within a steam cycle, hot gas path temperatures, inlet air flow within the gas turbine system, exhaust air flow within the gas turbine system, cooling air flow within the gas turbine, combustion pulsation, carbon monoxide emissions, and/or nitrous oxide emissions.

In block 94, the controller may determine a schedule and/or a limiting firing temperature at which to operate burners of a sequential environmental (SEV) combustor (e.g., second combustor). The limiting firing temperature and/or schedule may be based on one or more parameters, which may include a position of the inlet guide vanes 30 (IGV), an absolute or relative gas turbine load, an absolute or relative power plant load, compressor air mass flow, compressor discharge pressure, combustor inlet and outlet pressures, turbine inlet and outlet pressures, cooling air mass flow, cooling air pressure, cooling air temperature, hot gas path temperature, total or partial fuel flow, number of burners of the plurality of burners in operation or switched-off, ambient temperature, ambient pressure, or ambient humidity. Further, the limiting firing temperature and/or schedule may be restricted by operational limitations which may include a maximum acceptable firing temperature considering a metal temperature of parts of the gas turbine system, a maximum allowable firing temperature for nitrous oxide emissions, a minimum firing temperature to limit carbon monoxide emissions, and a minimum temperature for steam cycle operability. At block 96, the controller may control the firing temperature of burners of the SEV combustor to follow the schedule, to be at or below the limiting firing temperature, and/or to be within a specific range (e.g., within the operational limitations mentioned above).

At block 98, the controller may determine an operational point to operate the gas turbine system in low part load (LPL) operation. The operational point may be determined based on the one or more parameters that were received as inputs from the one or more sensors. For example, operational point may be based on a position of the IGV 30, a fuel flow to an SEV combustor (e.g., second combustor 18), a temperature within a steam cycle, pressure within a steam cycle, inlet air flow within the gas turbine system 10, exhaust air flow within the gas turbine system 10, hot gas path temperatures, cooling air flow within the gas turbine system 10, combustion pulsation, carbon monoxide emissions, or nitrous oxide emissions, or any combination thereof. During LPL, individual burners of the SEV combustor may be switched off as a load of the gas turbine system decreases. Further, operations in blocks 94 and 96 may be performed in conjunction with operations in block 98.

At block 100, the controller may start LPL mode of the turbine system based at least in part on reaching the operational point determined at block 98. Furthermore, in some embodiments, when the gas turbine system is in LPL operation, additional airflow may be provided to the gas turbine system at block 102. In some embodiments, the additional airflow may be provided from an external blower. In some embodiments, the additional airflow may be provided via steam injection system and/or may be provided via an internal source of the gas turbine engine.

Furthermore, it should be noted that all of the parameters discussed herein (e.g., an absolute or relative gas turbine load, an absolute or relative power plant load, compressor air mass flow, compressor discharge pressure, combustor inlet and outlet pressures, turbine inlet and outlet pressures, cooling air mass flow, cooling air pressure, cooling air temperature, hot gas path temperature, total or partial fuel flow, number of burners of the plurality of burners in operation or switched-off, ambient temperature, ambient pressure, ambient humidity, gas turbine firing temperatures, a position of inlet guide vanes, a temperature within a steam cycle, a fuel flow to a second combustor, pressure within a steam cycle, inlet air flow within a gas turbine system, exhaust air flow within a gas turbine system, cooling air flow within a gas turbine, combustion pulsation, carbon monoxide emissions, nitrous oxide emissions, a metal temperature of turbine parts, a lifetime of turbine parts, and/or hot gas path temperatures) may be measured (e.g., via a controller and sensors) and/or calculated (e.g., via a model).

Technical effects of the invention include enhancing the precision at which the gas turbine firing temperature and its associated parameters (e.g., gas turbine outlet temperature and/or conditions within the downstream steam cycle) are controlled. Overall, current embodiments provide for controlling the gas turbine system in narrow combustor operational windows to reach lower environmentally compliant loads, and supporting mechanical integrity of the turbine engine and plant components, which may be limited by a maximum temperature. Furthermore, enhancing the control precision provides for more burners of the sequential environment (SEV) combustor to be switched-off, and provides for a potential to increase an operation range by 5 to 10 percent of the nominal load. Accordingly, the reduction of minimum load may enhance load flexibility and reduce fuel consumption when electricity demand is temporarily low. Furthermore, operating the plant closer to a burner limiting firing temperature may increase the efficiency of low part load mode as well as increase efficiency of the turbine system in general. Further, environmental benefits may include increased precision in control of pollutant emissions, and a reduction of greenhouse gas emissions due to the increase of efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for operating a gas turbine system, comprising: utilizing a gas turbine controller to:
   determine, based on one or more operational parameters of the gas turbine system, a limiting firing temperature or a firing temperature schedule within an operational range of a firing temperature for operative burners of a second combustor located downstream of a first combustor when the gas turbine system is operating in a low part load mode where a plurality of the burners for the second combustor are switched-off, wherein the gas turbine controller comprises a relationship having the limiting firing temperature or the firing temperature schedule as a function of the one or more operational parameters, wherein the operational range comprises an upper temperature threshold and a lower temperature threshold, wherein the upper temperature threshold is defined by a lower temperature of a first firing temperature that corresponds with a nitrous oxide emissions limit and a second firing temperature that corresponds with a maximum metal temperature of parts of the gas turbine system, and wherein the lower temperature threshold is defined by a greater temperature of a third firing temperature that corresponds with a carbon monoxide emissions limit and a fourth firing temperature that corresponds with a minimum temperature sufficient for steam driven operation of a steam cycle;
   determine the firing temperature for the operative burners of the second combustor by directly measuring the firing temperature or utilizing a model;
   control, based on the determined firing temperature relative to the limiting firing temperature or the firing temperature schedule, the firing temperature of the operative burners to keep the firing temperature of the operative burners within the operational range of the firing temperature during the low part load mode; and control a blower to provide ambient air as cooling air to the gas turbine system when operating the gas turbine system in the low part load mode and based on a position of inlet guide vanes of a compressor of the gas turbine system.

2. The method of claim 1, wherein the limiting firing temperature or the firing temperature schedule is based at least in part on a calculated energy balance of a combustible and an oxidant within a burner of the plurality of the burners.

3. The method of claim 1, wherein the one or more operational parameters comprise the position of the inlet guide vanes of the compressor of the gas turbine system located upstream of both the first and second combustors.

4. The method of claim 3, wherein the operational range of the firing temperature of the operative burners is based at least in part on a minimum firing temperature relative to a minimum position of the inlet guide vanes and a minimum number of operative burners.

5. The method of claim 1, wherein the one or more operational parameters comprise a load of the gas turbine system.

6. The method of claim 1, wherein the one or more operational parameters comprises at least three of an absolute or relative gas turbine load, an absolute or relative power plant load, a compressor air mass flow, a compressor discharge pressure, combustor inlet and outlet pressures, turbine inlet and outlet pressures, a cooling air mass flow, a cooling air pressure, a cooling air temperature, a hot gas path temperature, a total or partial fuel flow, a number of burners of the plurality of burners in operation or switched-off, an ambient temperature, an ambient pressure, carbon monoxide emissions, nitrous oxide emissions, a combustion pulsation, or an ambient humidity.

7. The method of claim 1, wherein the gas turbine controller is configured to control, based on the limiting firing temperature or the firing temperature schedule, the firing temperature of the operative burners by at least one or more controls to switch-on or switch-off one or more burners of the plurality of burners.

8. The method of claim 7, wherein the one or more operational parameters comprise the position of the inlet guide vanes of the compressor of the gas turbine system located upstream of both the first and second combustors.

9. The method of claim 7, wherein the one or more operational parameters comprise one or more of a temperature within a steam cycle, a fuel flow to the second combustor, a pressure within a steam cycle, an inlet air flow within the gas turbine system, an exhaust air flow within the gas turbine system, a cooling air flow within the gas turbine, carbon monoxide emissions, nitrous oxide emissions, or a hot gas path temperature.

10. The method of claim 7, wherein the gas turbine controller is configured to switch-on or switch-off the one or more burners of the plurality of burners by controlling one or more fuel valves coupled to the one or more burners of the plurality of burners.

11. The method of claim 1, wherein the one or more operational parameters are determined by measurement via one or more sensors or by utilizing a model.

12. A method for operating a gas turbine system, comprising: utilizing a gas turbine controller to:
determine, based on one or more operational parameters of the gas turbine system, a schedule for a firing temperature within an operational range for operative burners of a second combustor located downstream of a first combustor when the gas turbine system is operating in a low part load mode where a plurality of the burners of the second combustor are switched-off, wherein the gas turbine controller comprises a relationship defining the schedule for the firing temperature as a function of the one or more operational parameters comprising a position of inlet guide vanes of a compressor of the gas turbine system located upstream of both the first and second combustors;

determine the firing temperature for the operative burners of the second combustor by directly measuring the firing temperature or utilizing a model;

control, based on the determined firing temperature relative to the schedule, the firing temperature of the operative burners during the low part load mode to keep the gas turbine system within the operational range of the gas turbine system, wherein the operational range of the gas turbine system comprise an upper temperature threshold for the firing temperature of the operative burners, wherein the upper temperature threshold is defined by a lower temperature of a first firing temperature that corresponds with a nitrous oxide emissions limit and a second firing temperature that corresponds with a maximum metal temperature of parts of the gas turbine system; and control a blower to provide ambient air as cooling air to the gas turbine system when operating the gas turbine system in the low part load mode and based on the position of the inlet guide vanes of the compressor of the gas turbine system.

13. The method of claim 12, wherein the operational range comprises the upper temperature threshold for the firing temperature of the operative burners and a lower temperature threshold for the firing temperature of the operative burners.

14. The method of claim 12, wherein the schedule is based at least in part on a calculated energy balance of a combustible and an oxidant within a burner of the plurality of the burners.

15. The method of claim 12, wherein the one or more operational parameters comprise a load of the gas turbine system.

16. The method of claim 13, wherein the lower temperature threshold is defined by a greater temperature of a third firing temperature that corresponds with a carbon monoxide emissions limit and a fourth firing temperature that corresponds with a minimum temperature sufficient for steam driven operation of a steam cycle.

17. A gas turbine system, comprising:
a gas turbine controller comprising a processor and a non-transitory memory encoding processor-executable instructions to:
determine, based on one or more operational parameters of the gas turbine system, a schedule for a firing temperature within an operational range for operative burners of a second combustor located downstream of a first combustor when the gas turbine system is operating in a low part load mode where a plurality of the burners for the second combustor are switched-off, wherein the gas turbine controller comprises a relationship defining the schedule for the firing temperature as a function of the one or more operational parameters comprising a position of inlet guide vanes of a compressor of the gas turbine system located upstream of both the first and second combustors;

determine the firing temperature for the operative burners of the second combustor by directly measuring the firing temperature or utilizing a model; and control, based on the determined firing temperature relative to the schedule, the firing temperature of the operative burners during the low part load mode to keep the gas turbine system within the operational range of the gas turbine system, wherein the operational range of the gas turbine system comprises a lower temperature threshold for the firing temperature of the operative burners, wherein the lower temperature threshold is defined by a greater temperature of a first firing temperature that corresponds with a carbon monoxide emissions limit and a second firing temperature that corresponds with a minimum temperature sufficient for steam driven operation of a steam cycle; and control a blower to provide ambient air as cooling air to the gas turbine system when operating the gas turbine system in the low part load mode and based on the position of the inlet guide vanes of the compressor of the gas turbine system.

18. The gas turbine system of claim 17, comprising:
the compressor;
the first combustor located downstream of the compressor;
a first turbine located between the first and second combustors, wherein the during operation of the gas turbine system hot gases are admitted to the first turbine;
the second combustor comprising the plurality of burners and located downstream of both the compressor and the first combustor;
a second turbine located downstream of the second combustor, wherein the hot gases from the second combustor are admitted to the second turbine;
at least one fuel line coupled to the plurality of burners; and
at least one valve disposed along the at least one fuel line, wherein the at least one valve is coupled to the gas turbine controller, and the gas turbine controller is configured to control the at least one valve to switch one or more individual burners of the plurality of burners on and off.

19. The gas turbine system of claim 17, wherein the operational range of the gas turbine system comprise an upper temperature threshold for the firing temperature of the operative burners, wherein the upper temperature threshold is defined by a lower temperature of a third firing temperature that corresponds with a nitrous oxide emissions limit and a fourth firing temperature that corresponds with a maximum metal temperature of parts of the gas turbine system.

* * * * *